United States Patent

Najmolhoda et al.

[11] Patent Number: 5,845,667
[45] Date of Patent: Dec. 8, 1998

[54] SINGLE STAGE VARIABLE FORCE SOLENOID PRESSURE REGULATING VALVE

[75] Inventors: Hamid Najmolhoda, Grand Rapids; David L. Seid, North Muskegon; David A. Nezwek, Marne, all of Mich.

[73] Assignee: Saturn Electronics & Engineering, Inc., Auburn Hills, Mich.

[21] Appl. No.: 770,635

[22] Filed: Dec. 19, 1996

[51] Int. Cl.⁶ ..................................... F16K 31/06
[52] U.S. Cl. .......................... 137/1; 137/82; 137/625.62
[58] Field of Search ................ 251/129.08; 137/625.65, 137/625.61, 624.64, 82, 625.62

[56] References Cited

U.S. PATENT DOCUMENTS

| | | |
|---|---|---|
| 4,077,431 | 3/1978 | Martin et al. . |
| 4,774,976 | 10/1988 | Janecke et al. ........................ 137/82 X |
| 5,051,631 | 9/1991 | Anderson . |
| 5,060,695 | 10/1991 | McCabe . |
| 5,075,584 | 12/1991 | Hendrixon et al. ............ 251/129.08 X |
| 5,186,093 | 2/1993 | Kervagoret . |
| 5,234,030 | 8/1993 | Kervagoret et al. . |
| 5,240,227 | 8/1993 | Sich . |
| 5,240,277 | 8/1993 | Scheulderman . |
| 5,414,398 | 5/1995 | Schumacher . |
| 5,611,370 | 3/1997 | Najmolhoda .................. 251/129.08 X |

Primary Examiner—Kevin Lee
Attorney, Agent, or Firm—Edward J. Timmer

[57] ABSTRACT

A pressure regulating variable force solenoid fluid control valve for regulating the pressure of a pressurized fluid in a fluid control system in proportion to the current level of an electrical input signal comprises a supply port for receiving pressurized fluid, a control port in fluid flow communication to the supply port via a primary orifice, the control port communicating with an external component, such as a hydraulic automobile transmission component to control operation thereof, and a variable force solenoid actuated valve that cooperates with a valve seat receiving pressurized fluid from the primary orifice to control flow of pressurized fluid to one or more exhaust ports as a means to regulate pressure at the control port in dependence upon electrical current to a coil of the solenoid actuated valve. A secondary bleed orifice is provided in a position between the supply port and the control port remote from the valve seat and proximate the control port to bleed pressurized fluid to the control port in a manner to provide more precise low pressure fluid control, for example, particularly at or near zero gage (control) pressure, over wide fluid pressures and temperatures and reduce negative pressures that can be generated proximate the valve seat when the valve is opened.

15 Claims, 5 Drawing Sheets

SINGLE STAGE VARIABLE FORCE SOLENOID PRESSURE REGULATING VALVE

FIELD OF THE INVENTION

The present invention relates to a proportional variable force solenoid operated valve that controls fluid pressure in response to electrical current applied to a valve solenoid and, more particularly, to a pressure regulating proportional variable force solenoid having multiple ports to provide more precise low pressure control over wide operating fluid pressures and temperatures.

BACKGROUND OF THE INVENTION

A proportional variable force solenoid control valve that is relative low in cost to manufacture and compact in size while maintaining substantially linear proportional fluid control is described in the Najmolhoda U.S. Pat. No. 4,988,074 issued Jan. 29, 1991, of common assignee herewith. The patented proportional variable force solenoid control valve comprises an outer steel solenoid housing and an aluminum valve member nozzle joined together mechanically such as by tabs on the steel solenoid housing being crimped about regions of the aluminum valve member nozzle.

The proportional variable force control valve includes a ferromagnetic (e.g. steel) armature suspended by low spring rate springs at opposite ends of the armature within the bore hole of a coreless solenoid bobbin for reciprocable movement between positions corresponding to a closed valve position and fully open valve position in response to applied electrical current to an electromagetic coil. The position of the armature is controlled by balancing the variable force of an electromagnetic field of an electromagnetic coil and the force of the magnetic field of a permanent ring magnet against the force of a compression coil spring which biases the valve toward the closed position of the valve. The electromagnetic coil, bobbin and armature reside in the steel solenoid housing. The fluid control valve on the end of the armature moves relative to a valve seat disposed in the aluminum valve nozzle to communicate a fluid inlet to fluid exhaust ports so as to regulate fluid pressure at fluid control ports in a manner proportional to the magnitude of applied electrical current.

A commercially manufactured version of the aforementioned patented proportional variable force solenoid fluid control valve has been modified to include a stainless steel ball valve and a separate stainless steel valve seat insert pressed in the nozzle. The ball valve is captured in a stainless steel cage between the valve seat and a rod-like, cylindrical shaped steel armature that moves relative to the valve seat in a manner proportional to the magnitude of electrical current applied to the electromagnetic coil. As the armature moves relative to the valve seat to actuate the valve, the ball valve is caused to follow the end of the armature by virtue of fluid pressure in the valve member housing and confinement in the ball valve cage in the nozzle. The fluid inlet is communicated to fluid exhaust ports by opening of the ball valve so as to regulate fluid pressure at fluid control ports in a manner proportional to the magnitude of electrical current applied to the coil.

A spool valve is disposed in the valve member housing for providing a two stage, high flow capability wherein pressurized fluid supplied to the inlet port initially is directed to bypass the control ports and flows to an end of the spool valve to move it from a zero fluid flow spool position to a maximum fluid flow spool position relative to the control ports as determined by the cracking pressure preset for the ball valve by adjustment of the coil spring force. Thereafter, a second stage of operation involves controlling the fluid flow through the control ports by moving the spool valve between minimum and maximum flow spool positions in a manner proportional to the magnitude of electrical current to the coil. Such proportional variable force solenoid control valves commercially manufactured to-date are operably mounted to a cast aluminum transmission body or case by a clamp plate, bolt, or both engaging an outer nozzle groove.

An object of the present invention is to provide a variable force solenoid fluid pressure regulating valve having improved low pressure control (e.g. at or near zero gage pressure) over wide operating pressures and temperatures.

Another object of the present invention is to provide a variable force solenoid fluid pressure regulating valve having mulitple orifices to improve low pressure control (e.g. at or near zero gage pressure) with stability over wide operating pressures and temperatures of valve operation.

SUMMARY OF THE INVENTION

The present invention provides a pressure regulating variable force solenoid fluid control valve for regulating the pressure of a pressurized fluid in a fluid control system in proportion to the current level of an electrical input signal. In one embodiment of the present invention, the pressure regulating variable force solenoid fluid valve comprises a supply port for receiving pressurized fluid, a control port in fluid flow communication to the supply port via a primary orifice. The control port communicates with an external fluid actuated component, such as a hydraulic automobile transmission component, to control operation thereof. The valve includes a variable force solenoid actuated valve that cooperates with a valve seat receiving pressurized fluid from the primary orifice to control flow of pressurized fluid to one or more exhaust ports as a means to regulate pressure at the control port in dependence upon electrical current to a coil of the solenoid actuated valve. A secondary bleed orifice is provided in a position between the supply port and the control port preferably proximate the control port in one embodiment of the invention to bleed pressurized fluid to the control port in a manner to provide more precise low pressure fluid control, for example, particularly as control port gage pressure approaches zero gage (control) pressure, over wide range of fluid pressures and temperatures. In particular, the secondary bleed orifice is effective to substantially eliminate negative pressure at the control port as control gage pressure approaches zero.

In a particular embodiment of the present invention, the pressure regulatng valve includes a first supply orifice downstream of the supply line connection to initially adjust supply fluid pressure. The supply orifice communicates to an internal passage of a sleeve that separates the supply port from the control port so as to supply pressurized fluid to the sleeve passage. The sleeve includes a primary orifice at an end proximate the valve seat for providing pressurized fluid from the sleeve passage to the control port and a secondary bleed orifice in a wall of the sleeve proximate the control port, although the bleed orifice can be disposed at other locations to achieve the advantages of more precise low pressure control discussed above.

The solenoid that actuates the valve may optionally comprise an armature in engagement with the valve and movable in response to electrical current applied to a solenoid, spring means for biasing the armature in a direction to establish a valve fluid pressure response to current level supplied to the solenoid (i.e. fluid pressure versus solenoid current), and a valve housing closure that engages the spring means and that is permanently deformed after valve assembly to position the valve housing closure relative to the spring means in a manner to adjust the valve fluid pressure response to a desired performance specification.

The foregoing and other objects, features, and advantages of the invention will become apparent from the following more detailed description taken with the accompanying following drawings.

DESCRIPTION OF THE INVENTION

Figure 1:
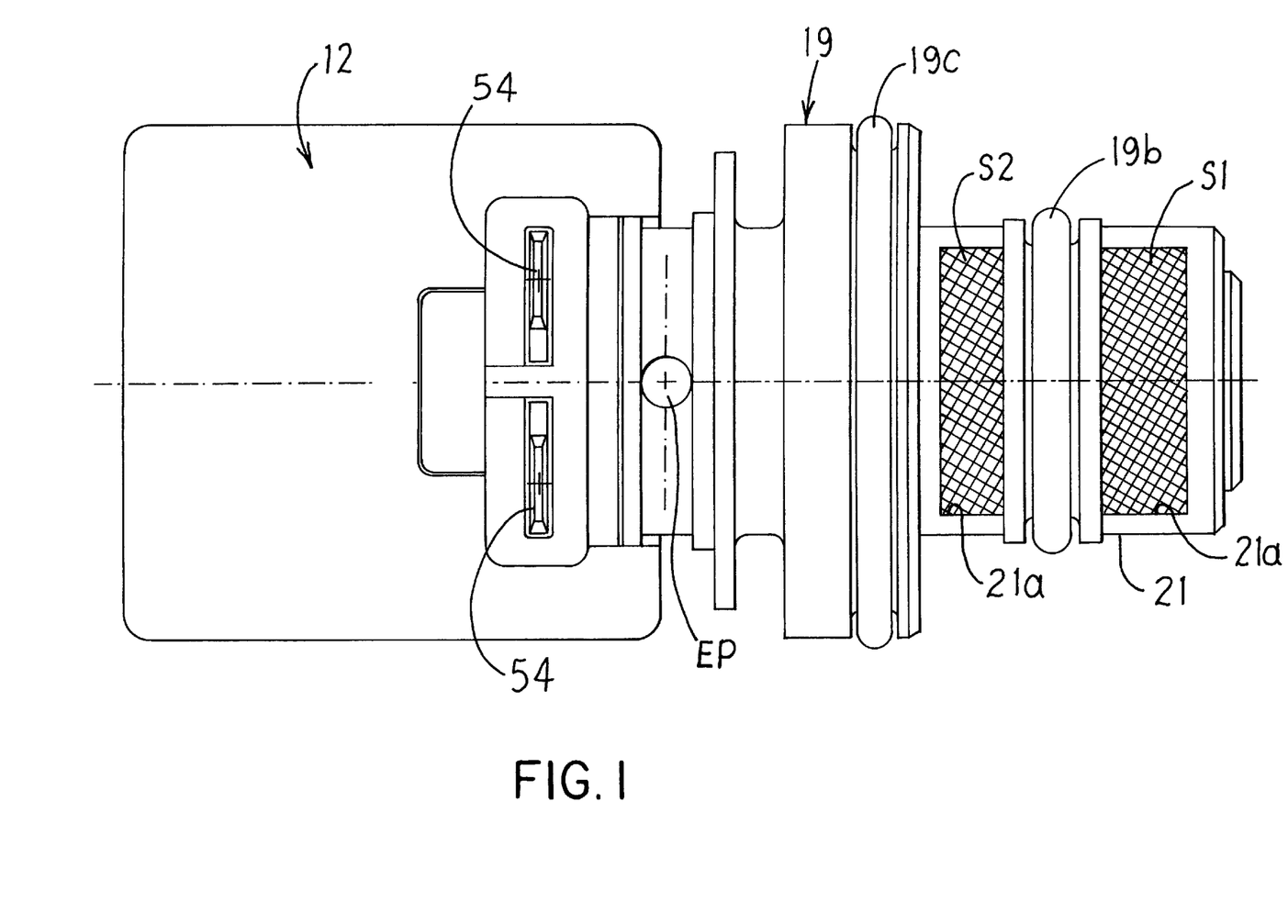
FIG. 1 is a plan view of a single stage pressure regulating proportional variable force solenoid fluid valve in accordance with an embodiment of the invention.
Figure 2:
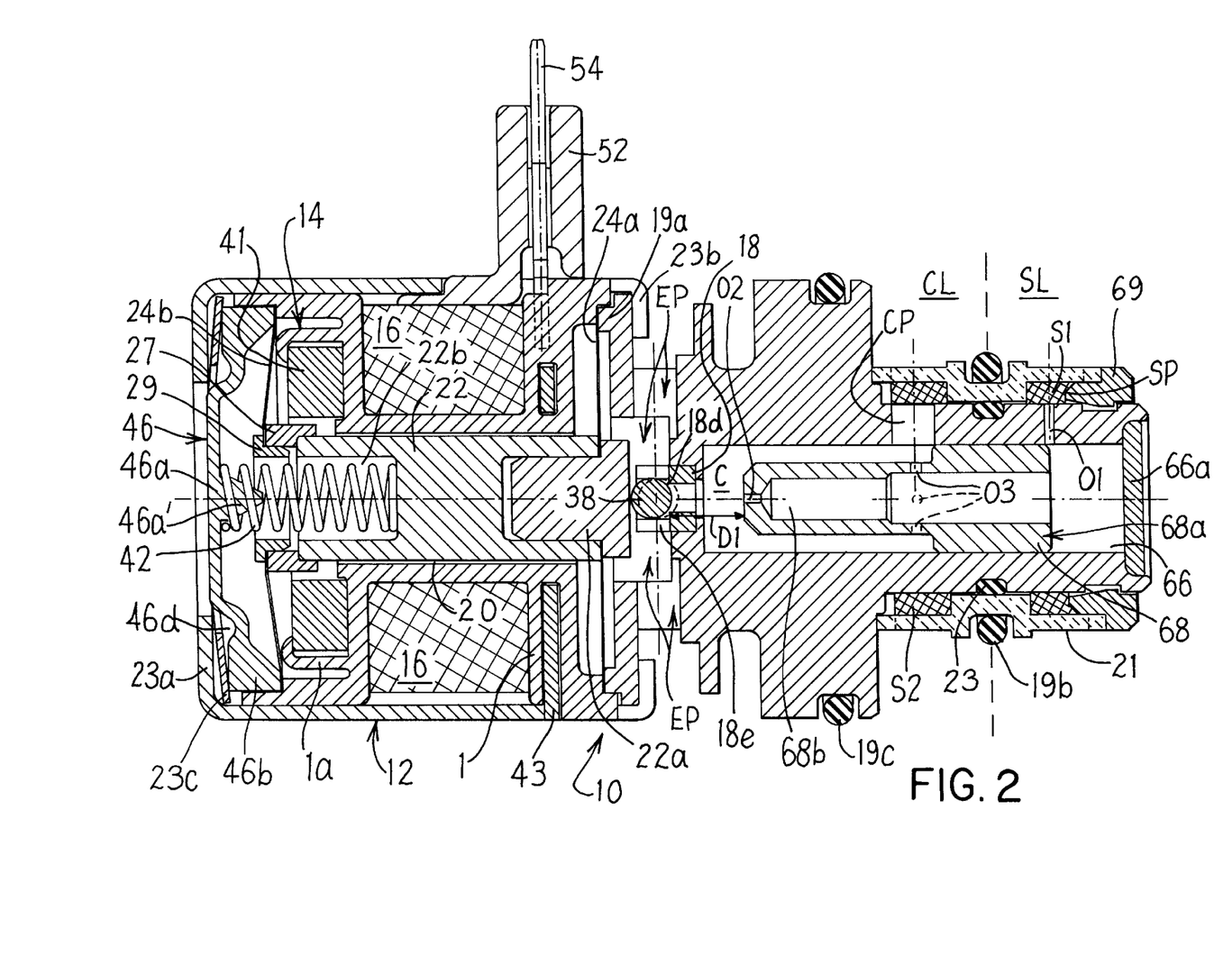
FIG. 2 is a longitudinal cross section view of the pressure regulating valve of FIG. 1.

Referring to FIGS. 1–2, a proportional variable force solenoid fluid control valve 10 includes a can or housing 12 and a nozzle 19 with the can or housing 12 enclosing solenoid components for actuating a valve mechanism in a manner to be described below. The can or housing 12 preferably comprises steel or other magnetically permeable material. The nozzle 19 preferably comprises a substantially non-magnetic material having little or no magnetic permeability, for example, as compared to the magnetic permeability of a ferromagnetic material, such as steel. A material particularly suited for the nozzle 19 comprises aluminum and its alloys or thermoplastic formed by casting or injection molding to required configuration to receive the solenoid actuated valve components to be described.

The solenoid actuated fluid control valve 10 includes a solenoid 14 comprising an electromagnetic coil 16 wound about a molded plastic bobbin 18 which has a cylindrically shaped bore hole 20 through the longitudinal axis thereof. The bobbin 18 is made of glass filled thermoplastic. A rod-like steel armature 22 is suspended within the bore hole 20 of the plastic bobbin 18 by first and second thin low spring rate springs 24a, 24b.

The plate springs 24a, 24b are of the type described in U.S. Pat. No. 4,988,074, the teachings of which are incorporated herein by reference. That is, the spring plates are formed from very thin non-magnetic austenitic stainless steel, such as full hard austenitic stainless steel, which provides a very low rate spring for the spring configuration shown in FIG. 5 of the aforementioned '074 patent. The outer periphery of the first plate spring 24a is mounted between a flange of bobbin 18 and flanged section 19a of the nozzle 19. The inner periphery of the first plate spring 24a is mounted between the armature 22 and an armature plug 22a made of steel.

The outer periphery of the second plate spring 24b is mounted between a flange of the bobbin 18 and an end closure 46. The inner periphery of the second plate spring 24b is mounted between a first collar 27 affixed to the armature 22 by press fit and made of brass and a second collar 29 press fit in the first collar 27 and made of brass. By use of the spring plates 24a, 24b, the armature 22 is suspended for free axial longitudinal movement within the bobbin 18.

The armature 22 comprises a flat outermost axial end having a counterbore 22b that receives a coil compression spring 42 for biasing the the armature 22 to the right in FIG. 2. The coil compression spring 42 (spring biasing means) is trapped between the axial armature end and a central hub 46a of the valve housing cap or closure 46. The central hub 46a includes an inwardly, axially extending cylindrical spring locating projection or stud 46a' that receives the coil spring 42 with the end of the spring 42 engaging the inner surface or wall of the central hub 46a as shown in FIG. 2. The armature 22 is biased to a valve closed position by the coil spring 42 when the solenoid electromagnetic coil 16 is deenergized.

The valve housing cap or closure 46 is deformable in a manner to adjust the force exerted by the coil spring 42 on the armature 22 and thus the valve fluid pressure response to electrical current level supplied to the solenoid 14 (i.e. fluid pressure versus solenoid current). In particular, the force exerted by the coil spring 42 on the armature 22 is adjusted using an adjustment tool to provide a desired bleed rate of fluid past ball valve 38 or cracking pressure of the ball valve 38 in a manner described in copending patent application Ser. No. 08/586,056 of common assignee herewith to provide a desired fluid pressure versus solenoid current response. The housing closure 46 includes a peripheral region 46b engaged by an end region of the can or housing 12 such that the central hub 46a engages the spring 42. The closure 46 comprises machined aluminum alloy.

The closure 46 is deformable in a region defined by an annular recessed or grooved region 46d that encircles central flat closure hub 46a. The recessed or grooved region 46d is disposed concentrically about the central hub 46a between the hub 46a and the peripheral lip 46c. The annular recessed or grooved region 46d has a relatively smaller cross-section, FIG. 2, as compared to the peripheral region 46b. The central hub 46a typically suffers the primary or majority of permanent deformation by engagement with the adjustment tool to permit axial adjusting movement of the hub 46a relative to the peripheral region 46b, although the grooved region 46d also may undergo some deformation to this same end. The grooved region 46d helps to confine the majority of deformation to the central hub 46a. The central hub 46a is permanently adjusted in axial position after the closure 46 is secured to the valve housing 19 to adjust the valve response.

An axially magnetized permanent ring magnet 41 is held in position relative to the coil 16 by a bobbin retainer flange 18a. The ring magnet 41 thereby is disposed at the rear end of the bobbin 18 axially rearward of the coil 16. Ring magnet 41 is formed of rare earth permanent magnet material permitting use of a reduced size magnet that results in a compact solenoid and enhanced stability, such as reduced loss of magnetism at elevated temperatures. The ring magnet 41 produces a permanent magnetic field that substantially saturates the armature 22 even in the absence of electrical current to the coil 16. A steel washer 43 is disposed proximate the coil 16 and armature 22 to concentrate magnetic flux. Thus, a relatively smaller electromagnetic field is required to move the armature 22 between axial positions coresponding to valve "on" and "off" states where the "on" state provides a zero supply gage pressure at control port CP and the "off" state provides full pressurized fluid at control port CP.

The proportional variable force solenoid control valve described using a ring magnet in combination with a electromagnetic coil is described in U.S. Pat. No. 4,988,074 and copending patent application Ser. No. 08/337,613 (allowed), the teachings of which are incorporated herein by reference.

A plastic connector body 52 shown in FIG. 2 is mounted on the bobbin 18 and exits the can or housing 12 at a side thereof. The connector body 52 includes electrical contacts 54 that are used to provide electrical current to the coil 16. The electrical contacts 54 extend through the bobbin 18 and through apertures in the connector body 52. Such electrical contacts 54 are shown in the aforementioned U.S. Pat. No. 4,988,074. The ends of the electrical contacts 54 are connected to the wires of the electromagnetic coil 16 for receiving an electrical current signal from a variable current source (not shown).

The can or housing 12 includes inwardly extending, annular end shoulders 23a, 23b to confine the solenoid components in the housing 12 and connect the nozzle 19 to the can or housing. An annular spring washer 23c is provided to securely locate the solenoid components by accommodating tolerance stackups.

As shown in FIG. 2, the innermost armature plug 22a of the armature 22 engages an elastomeric or metal ball valve 38 that cooperates with a valve seat 18d formed on the valve seat insert 18 residing in the nozzle 19. The ball valve 38 and valve seat 18d define a fluid diverting or exhausting valve for diverting or exhausting fluid to one or more exhaust ports EP in a manner described herebelow that can be communicated to a fluid sump or return (not shown).

The ball valve 38 is received and confined laterally in a flat-sided recess 18e of the valve seat insert 18 between the innermost armature plug end 22a and the valve seat 18d. In this valve arrangement, the ball valve 38 is biased against the armature plug end 22a and follows movement of the armature 22 in a direction toward or away from the valve seat 18d by virtue of the fluid pressure on the ball valve and by virtue being captured in the recess 18e.

The nozzle 19 includes a nozzle section 19a joined to the can or housing 12 by crimped can shoulders 23b and that includes O-ring seals 19b, 19c for sealing on the components of the mating fluid control system, such as on an automatic transmission valve body. The seal 19c sealingly separates a supply line or chamber SL and control line or chamber CL as schematically illustrated in FIG. 2. The control line or chamber CL typically is communicated to a downstream component (not shown) external of the pressure regulating valve described hereabove to control operation thereof. The component can be a line pressure control valve of an automobile automatic transmission for purposes of illustration and not limitation. The supply line or chamber SL is communicated to a source of pressurized fluid, such as a hydraulic fluid pump (not shown).

The nozzle 19 includes a fluid filtering screen S1 for removing dirt or debri from fluid entering the nozzle section 19a via the supply port SP. The nozzle 19 also includes a fluid filtering screen S2 for removing dirt or debri from fluid exiting the nozzle section 19a via the control port CP. The filtering screens S1, S2 are held in position on the nozzle 19 by a tubular molded plastic filter support member 21 having windows 21a exposing the screens S1, S2. O-ring seal 19b resides on the support member 21, while O-ring seal 23 resides between nozzle 19 and support member 21. A filter retainer 69 made of plastic material is provided to lock the filter and support member in position.

The nozzle 19 includes a longitudinal passageway 66 having a cylindrical configuration for receiving a fixed sleeve 68. The nozzle 19 is machined to include a first orifice O1 that is sized in diameter to initally adjust supply pressure entering the passageway 66. The passageway 66 is closed at the end remote from the solenoid by a closure cap 66a.

Fixed sleeve 68 is received in the nozzle in a close fit, sealed manner. The sleeve 68 includes an open axial end 68a that receives pressurized fluid from the orifice O1 and an inner passageway 68b having radially stepped down sections for ease of manufacture with the stepped down section 68b terminating in a primary orifice O2 that is disposed opposite and proximate the valve seat insert 18 in a chamber C. In particular, the primary orifice O2 is located axially spaced from the valve seat 18d defining flat-sided fluid exhaust recess 18e through which pressurized fluid is exhausted to exhaust ports EP to regulate fluid pressure at control port CP. The exhaust ports EP are disposed on the housing 19 proximate the ball valve 38 as shown in FIG. 2 and communicate with an exhaust sump or return (not shown). Four circumferentially spaced exhaust ports EP can be used but the invention is not limited to this end as any number or such ports can be used.

Pressure regulation is achieved by movement of the armature 22 in response to electrical current to the coil 16 to exhaust pressurized fluid from chamber C. When no current is provided to the coil 16, the spring 42 biases the ball valve 38 to close on valve seat 18d ("off" state). The control port CP receives the pressure present at valve seat 18d at this time. When the coil 16 is energized by a maximum selected electrical current, the armature 22 is moved away from the valve seat 18d to the maximum extent ("on" state) to allow ball valve 38 to fully open and provide a zero or near zero fluid gage pressure at control port CP. Movement of the armature 22 between these positions is effected by varying the current to the coil 16 to vary the ball valve position relative to valve seat 18d and thus exhaust more or less pressurized fluid from chamber C to port(s) EP as needed to regulate fluid pressure at control port CP in the desired manner.

A secondary bleed orifice O3 is provided in accordance with one embodiment of the present invention in a position between the supply port SP and the control port CP remote from the valve seat 18d and proximate the control port CP to bleed pressurized fluid to the control port CP in a manner to provide more precise low pressure fluid control, for example, as the control port pressure approaches zero gage (control) pressure. This improved low pressure control is provided over a wide range of fluid pressures and temperatures and reduces negative pressures that can be generated proximate the valve seat 18d in chamber C when the valve is opened. In FIG. 2, the secondary bleed orifice O3 is shown disposed directly opposite to the control port CP. However, the position of the bleed orifice O3 can be varied to other axial locations of the sleeve 68 such as shown, for purposes of illustration and not limitation only, by dashed lines in FIG. 2.

The secondary bleed orifice O3 is sized in diameter to bleed pressurized fluid to the control port CP when the ball 38 valve is opened in response to movement of the armature 22 by energization of the coil 16. The fluid bled from orifice O3 can counteract any slightly negative pressure that can be generated by venturi effects in the chamber C when the valve 38 is opened as pressurized fluid is exhausted to the exhaust ports EP and provide a more precise low pressure control over wide operating fluid pressures and temperatures.

The ratio of the areas of the supply orifice O1, primary orifice O2, and secondary bleed orifice O3 is controlled to this end to minimize "off" (i.e. fluid pressure at control port CP approaching zero gage) pressure variations at the control port CP that result from such negative pressure in chamber C and variations in supply line pressure. For purposes of illustration and not limitation, the ratio of the cross-section areas of the cylindrical supply orifice O1, primary orifice O2, and secondary bleed orifice O3 can be controlled at 1.25:1.25:1.00 for operation under fluid supply pressures in the range of 40 to 250 psi where fluid exhaust opening 18e defined by the valve seat 18d has an area of 0.0035 square inches and is axially positioned about 0.100 to 0.180 inches (distance D1) from the orifice O2.

Figure 3:
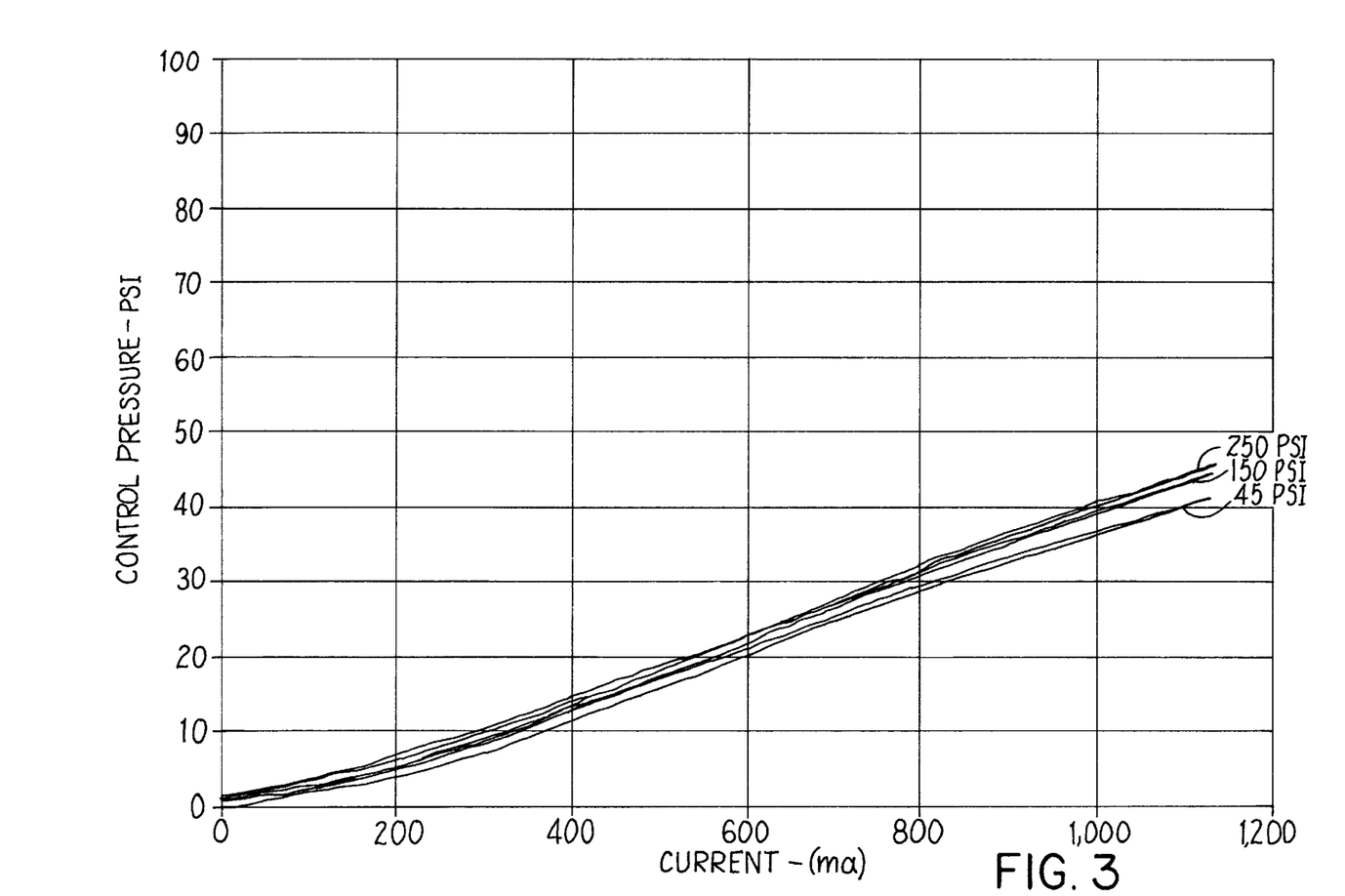
FIG. 3 is graph of control pressure versus electrical current to the solenoid coil for a single stage pressure regulating proportional variable force solenoid fluid valve in accordance with an embodiment of the invention.
Figure 4:
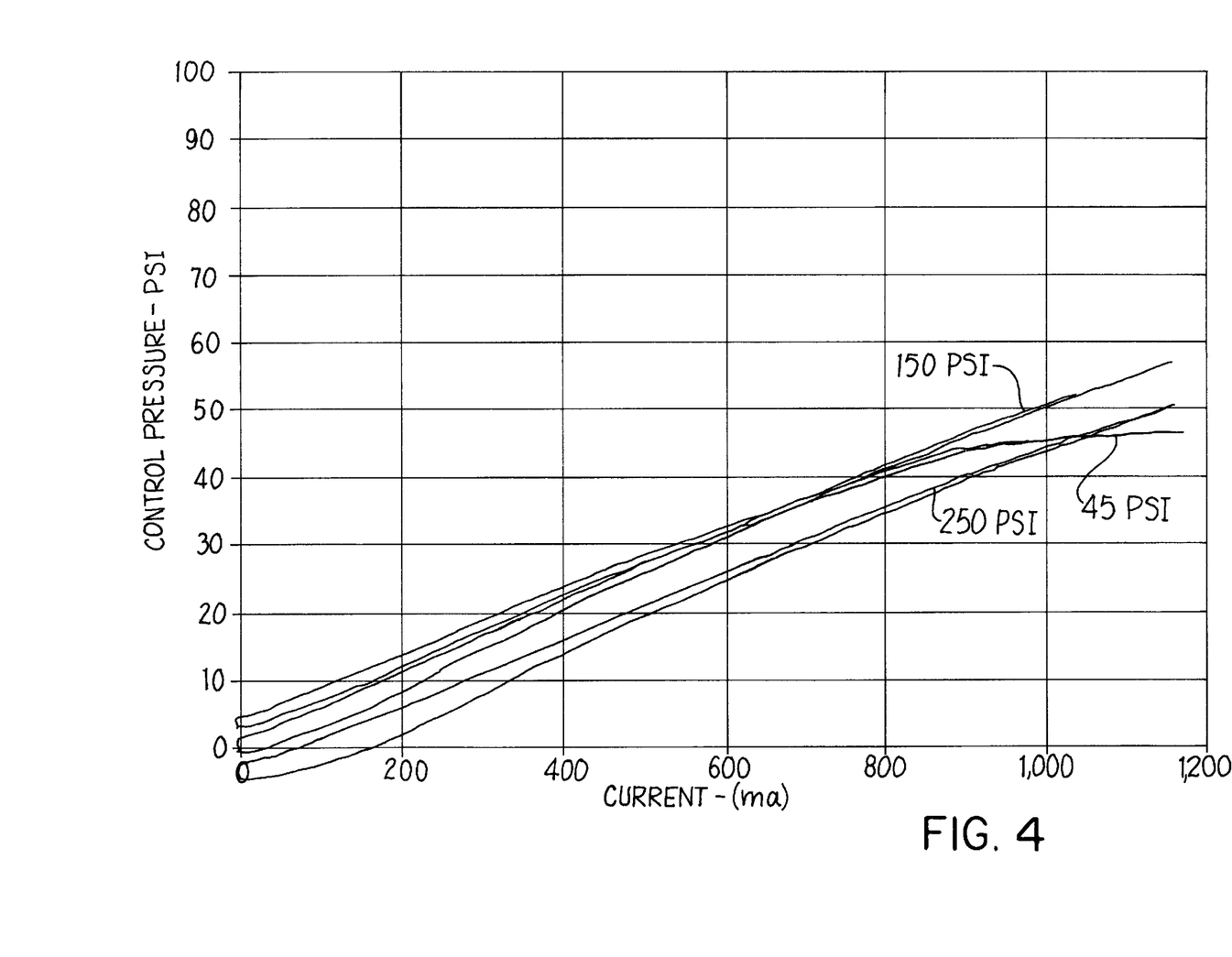
FIG. 4 is a similar graph of control pressure versus electrical current to the solenoid coil for a single stage pressure regulating proportional variable force solenoid fluid valve of similar construction but without a secondary bleed orifice.

FIG. 3 represents a graph of control pressure versus electrical current to the solenoid coil for a single stage pressure regulating proportional variable force solenoid fluid pressure regulating valve in accordance with the embodiment of the invention described hereabove. It is apparent that precise low pressure control at or near zero gage pressure at control port CP is provided at different supply line pressures of 45, 150 and 250 psi. In contrast, FIG. 4 is a graph of control pressure versus electrical current for a single stage pressure regulating proportional variable force solenoid fluid valve of similar construction but without a secondary bleed orifice. The loss of precise low pressure control and generation of negative pressures at the control port CP at different supply line pressures of 45, 150 and 250 psi are evident.

Figures 5, 5A:
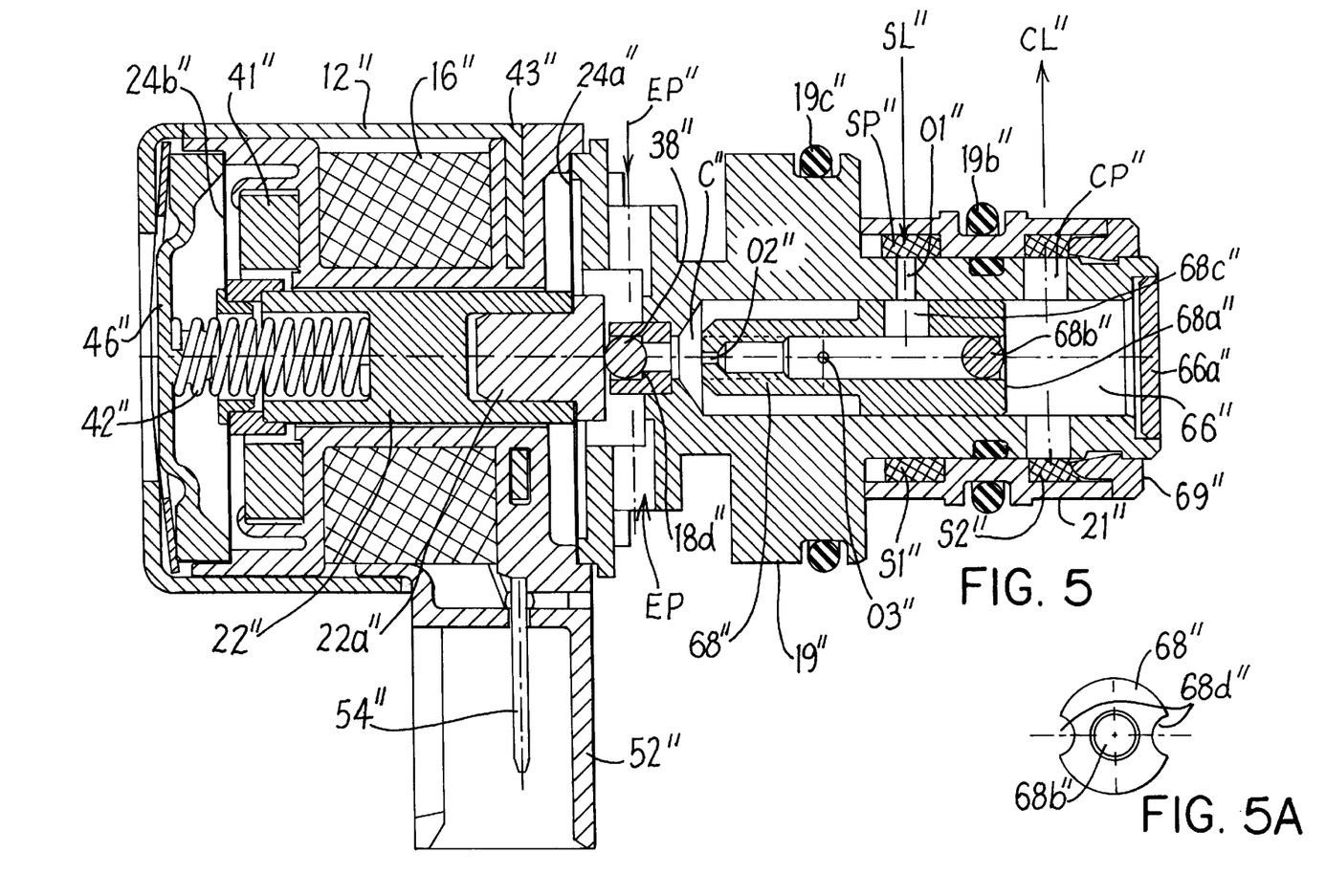
FIG. 5 is a longitudinal cross section view of a single stage pressure regulating proportional variable force solenoid fluid valve in accordance with another embodiment of the invention.
FIG. 5A is an end view of the sleeve inserted in the nozzle of FIG. 5.

FIG. 5 illustrates another embodiment of the invention having a different arrangement of valve components and supply and control ports. In FIG. 5, like or similar features of FIGS. 1–2 are represented by like reference numerals double primed. The embodiment of FIG. 5 differs from that of FIGS. 1–2 in that the control port CP" and supply port SP" are reversed in axial position on the nozzle 19". The sleeve 68" includes a ball 68b" that is fixed in position to plug or close the open sleeve end 68a" so that pressurized fluid (e.g. hydraulic fluid) entering the supply port SP" flows through orifice O1" through a sleeve opening 68c" and through primary orifice O2" to the chamber C". Pressurized fluid that exits the primary orifice O2" flows from chamber C" to the control port CP" via side scallops or recesses 68d" formed in the sleeve 68" as shown in FIG. 5A. The ball valve 38" functions in the same manner as in the ball valve 38 of embodiments of FIGS. 1–2 to exhaust pressurized fluid from chamber C" via exhaust ports EP" in response to movement of the armature 22" determined by the electrical current provided to the coil 16".

The secondary bleed orifice O3" is disposed through the sleeve wall between the orifice O2" and supply opening 68c" for functioning in a manner as described for secondary bleed orifice O3 of FIGS. 1–2.

Although certain preferred embodiments of the pressure regulating solenoid valve of the invention have been shown and described in detail, it should be understood that variations or modifications may be made without departing from the spirit or scope of the present invention.

We claim:

1. A solenoid actuated valve for regulating the pressure of a pressurized fluid in a fluid control system in proportion to the current level of an electrical input signal, comprising a supply port for receiving pressurized fluid and a control port, a fluid passageway for receiving pressurized fluid from said supply port and communicated to the control port by a primary orifice, the control port communicating with an external fluid pressure actuated component, a variable force solenoid actuated valve that cooperates with a valve seat receiving pressurized fluid from the primary orifice to control flow of pressurized fluid to one or more exhaust ports as a means to regulate pressure at the control port in dependence upon electrical current to a coil of the solenoid actuated valve, and a secondary bleed orifice disposed in a position between the supply port and the primary orifice to bleed pressurized fluid from said fluid passageway to the control port in a manner to provide more precise low pressure fluid control.

2. The valve of claim 1 wherein the bleed orifice is disposed proximate the control port.

3. The valve of claim 2 wherein the bleed orifice is disposed directly opposite the control port.

4. The valve of claim 1 wherein the bleed orifice is effective to substantially eliminate negative pressure at said control port when gage fluid pressure at said control port approaches zero.

5. A solenoid actuated valve for regulating the pressure of a pressurized fluid in a fluid control system in proportion to the current level of an electrical input signal, comprising a supply port for receiving pressurized fluid and having a supply orifice for initially adjusting supply pressure, a sleeve defining a fluid passageway for receiving pressurized fluid from said supply orifice and communicated to a control port by a primary orifice of said sleeve, said primary orifice being disposed at an end of said sleeve proximate a valve seat, said control port communicating with an external fluid pressure actuated component, a variable force solenoid actuated valve that cooperates with said valve seat to control flow of pressurized fluid to one or more exhaust ports as a means to regulate pressure at the control port in dependence upon electrical current to a coil of the solenoid actuated valve, said sleeve including a secondary bleed orifice disposed in a position between said supply port and said primary orifice to bleed pressurized fluid to said control port from said fluid passageway in a manner to provide more precise low pressure fluid control at said control port.

6. The valve of claim 5 wherein the bleed orifice is disposed directly opposite the control port.

7. The valve of claim 5 wherein the bleed orifice is effective to substantially eliminate negative pressure at said control port when gage fluid pressure at said control port approaches zero.

8. The valve of claim 5 wherein said valve comprises a ball valve movable relative to said valve seat by movement of a solenoid armature in response to electrical current to a solenoid coil.

9. The valve of claim 5 wherein the ratio of areas of the supply orifice, primary orifice, and bleed orifice are selected to substantially eliminate negative pressure at said control port when gage fluid pressure at said control port approaches zero.

10. The valve of claim 5 wherein said sleeve is received in a passageway of a valve nozzle in a manner to block fluid communication between the supply port and control port, said primary orifice and secondary bleed orifice providing fluid flow to said control port.

11. The valve of claim 10 wherein said sleeve includes an open end communicated to said supply port to receive supply pressure, said primary orifice being disposed at another end of said sleeve remote from said open end and said bleed orifice being disposed between said open end and said primary orifice, said primary orifice and bleed orifice being communicated to a chamber that communicates with said control port.

12. The valve of claim 10 wherein said sleeve includes a closed end proximate said control port, said primary orifice being disposed at another end of said sleeve remote from said closed end and said bleed orifice being disposed between said closed end and said primary orifice, said sleeve including an opening to an internal fluid passage of said sleeve, said opening being disposed between said closed end and said bleed orifice and communicating to said supply port to supply supply pressure to said primary orifice via said internal fluid passage, said primary orifice and bleed orifice being communicated to said control port via a sleeve fluid channel disposed external of said sleeve.

13. In a method of regulating pressure of a pressurized fluid in a fluid control system wherein a valve is actuated to exhaust fluid from a chamber communicated to a fluid supply port and a fluid control port so as to regulate fluid pressure at said control port, the improvement comprising supplying fluid pressure to said chamber from said supply port via a fluid passageway having a primary orifice communicating said fluid passageway and said chamber and bleeding pressurized fluid to the control port from said fluid passageway through a secondary bleed orifice disposed between said supply port and said primary orifice when fluid is exhausted from said chamber by actuating said valve so as to provide more precise fluid control by reducing negative pressure at said control port as fluid pressure thereat approaches zero.

14. A solenoid actuated valve for regulating the pressure of a pressurized fluid in a fluid control system in proportion to the current level of an electrical input signal, comprising a supply port for receiving pressurized fluid and having a supply orifice for initially adjusting supply pressure supplied to a housing, a sleeve disposed in a passageway of said housing and having an open end communicated to said supply orifice to receive supply pressure and having a primary orifice disposed at another end remote from said open end and proximate a valve seat, said sleeve having a secondary bleed orifice in a wall of said sleeve between said open end and said primary orifice, said primary orifice and secondary bleed orifice being communicated to a chamber that communicates with a control port, said control port communicating with an external fluid pressure actuated component, a variable force solenoid actuated valve that cooperates with said valve seat to control flow of pressurized fluid to one or more exhaust ports as a means to regulate pressure at the control port in dependence upon electrical current to a coil of the solenoid actuated valve, said secondary bleed orifice being disposed in a position on said sleeve to bleed pressurized fluid to said chamber in a manner to provide more precise low pressure fluid control at said control port.

15. A solenoid actuated valve for regulating the pressure of a pressurized fluid in a fluid control system in proportion to the current level of an electrical input signal, comprising a supply port for receiving pressurized fluid and having a supply orifice for initially adjusting supply pressure supplied to a housing, a sleeve disposed in a passageway of said housing and having a closed end proximate a control port, said sleeve having a primary orifice disposed at another end remote from said closed end and proximate a valve seat and a secondary bleed orifice in a wall of said sleeve between said closed end and said primary orifice, said sleeve having an opening disposed between said closed end and said primary orifice to supply supply pressure to said primary orifice and secondary bleed orifice via an internal fluid passageway of said sleeve, said primary orifice and secondary bleed orifice communicating to the control port via a fluid channel disposed external of said sleeve, said control port communicating with an external fluid pressure actuated component, a variable force solenoid actuated valve that cooperates with said valve seat to control flow of pressurized fluid to one or more exhaust ports as a means to regulate pressure at the control port in dependence upon electrical current to a coil of the solenoid actuated valve, said secondary bleed orifice being disposed in a position on said sleeve to bleed pressurized fluid to said channel in a manner to provide more precise low pressure fluid control at said control port.

\* \* \* \* \*

UNITED STATES PATENT AND TRADEMARK OFFICE
CERTIFICATE OF CORRECTION

PATENT NO. : 5,845,667

DATED : Dec. 8, 1998

INVENTOR(S) : Najmolhoda et al.

It is certified that error appears in the above-identified patent and that said Letters Patent is hereby corrected as shown below:

Column 3, line 53;
        "18" should be -1-.

Column 3, line 55;
        "18" should be -1-.

Column 3, line 67;
        "18" should be -1-.

Column 4, line 5;
        "18" should be -1-.

UNITED STATES PATENT AND TRADEMARK OFFICE
CERTIFICATE OF CORRECTION

PATENT NO. : 5,845,667
DATED : December 8, 1998
INVENTOR(S) : Najmolhoda et al

Page 2 of 2

It is certified that error appears in the above-identified patent and that said Letters Patent is hereby corrected as shown below:

Column 4, line 60;
        "18a" should be --1a--.

Column 4, line 61;
        "18" should be --1--.

Column 5, line 15;
        "18" should be --1--.

Column 5, line 18;
        "18 should be --1--.

Signed and Sealed this

Twentieth Day of June, 2000

Attest:

Q. TODD DICKINSON

*Attesting Officer*      *Director of Patents and Trademarks*